(12) United States Patent
Katz et al.

(10) Patent No.: US 10,531,645 B2
(45) Date of Patent: Jan. 14, 2020

(54) POULTRY DRINKER SYSTEM

(71) Applicant: Plasson Ltd., D.N. Menashe (IL)

(72) Inventors: Oded Katz, D.N. Menashe (IL); Yonatan Bernat, D.N. Menashe (IL)

(73) Assignee: Plasson Ltd., D.N. Menashe (IL)

( * ) Notice: Subject to any disclaimer, the term of this patent is extended or adjusted under 35 U.S.C. 154(b) by 270 days.

(21) Appl. No.: 15/294,862

(22) Filed: Oct. 17, 2016

(65) Prior Publication Data
US 2017/0042127 A1 Feb. 16, 2017
US 2017/0223932 A9 Aug. 10, 2017

Related U.S. Application Data

(63) Continuation-in-part of application No. 13/558,632, which is a continuation-in-part of application No. PCT/IB2011/051077, filed on Mar. 15, 2011, now abandoned.

(30) Foreign Application Priority Data

Jan. 27, 2010 (GB) .................................. 1001294.6

(51) Int. Cl.
*A01K 39/02* (2006.01)
*F02M 21/02* (2006.01)

(52) U.S. Cl.
CPC ..... *A01K 39/0213* (2013.01); *F02M 21/0239* (2013.01)

(58) Field of Classification Search
USPC .......... 119/72, 72.5, 71; 137/505.15, 505.18, 137/505.41, 599.09; 251/61, 331, 335.2
See application file for complete search history.

(56) References Cited

U.S. PATENT DOCUMENTS

| | | | |
|---|---|---|---|
| 4,922,955 | A | 5/1990 | Uri |
| 5,072,749 | A | 12/1991 | Ligh |
| 5,143,257 | A | 9/1992 | Austin et al. |
| 5,284,110 | A | 2/1994 | Hostetler |
| 5,429,072 | A | 7/1995 | Schumacher |

(Continued)

FOREIGN PATENT DOCUMENTS

| | | |
|---|---|---|
| GB | 322993 | 12/1929 |
| JP | 2005202736 | 7/2005 |

*Primary Examiner* — Andrea M Valenti
(74) *Attorney, Agent, or Firm* — Roach Brown McCarthy & Gruber, P.C.; Kevin D. McCarthy

(57) ABSTRACT

A drinker system, comprising: a central pressure regulator configured regulate a fluid pressure to a regulated input pressure; and a plurality of pressure reducers each comprising: a high-pressure zone configured to receive the fluid from the regulator at the regulated input pressure, a low-pressure zone configured to provide the fluid to one of multiple drinker lines at a low output pressure maintained at a constant proportion to the regulated input pressure, and a moveable integral piece comprising a small diaphragm rigidly connected to a large diaphragm, wherein the small diaphragm is disposed in the high pressure zone and the large diaphragm is disposed in the low pressure zone, and wherein the constant proportion between the low output pressure and the regulated input pressure corresponds to the ratio between the surface area of the small diaphragm and the surface area of the large diaphragm.

5 Claims, 7 Drawing Sheets

(56) References Cited

U.S. PATENT DOCUMENTS

| | | | |
|---|---|---|---|
| 5,765,588 A * | 6/1998 | Katz | A01K 39/0213 |
| | | | 137/238 |
| 5,870,970 A | 2/1999 | Katz | |
| 5,967,167 A | 10/1999 | Johnson | |
| 6,240,956 B1 | 6/2001 | Johnson | |
| 6,253,708 B1 * | 7/2001 | Johnson | A01K 39/02 |
| | | | 119/72 |
| 6,341,620 B1 | 1/2002 | Mutter | |
| 6,776,180 B1 | 8/2004 | Yonnet | |
| 7,219,689 B2 | 5/2007 | Pollock et al. | |
| 8,056,509 B1 | 11/2011 | Hostetler | |
| 2003/0111019 A1 | 6/2003 | Pollock | |
| 2004/0149231 A1 | 8/2004 | Pollock | |
| 2009/0235869 A1 | 9/2009 | Nardine et al. | |

* cited by examiner

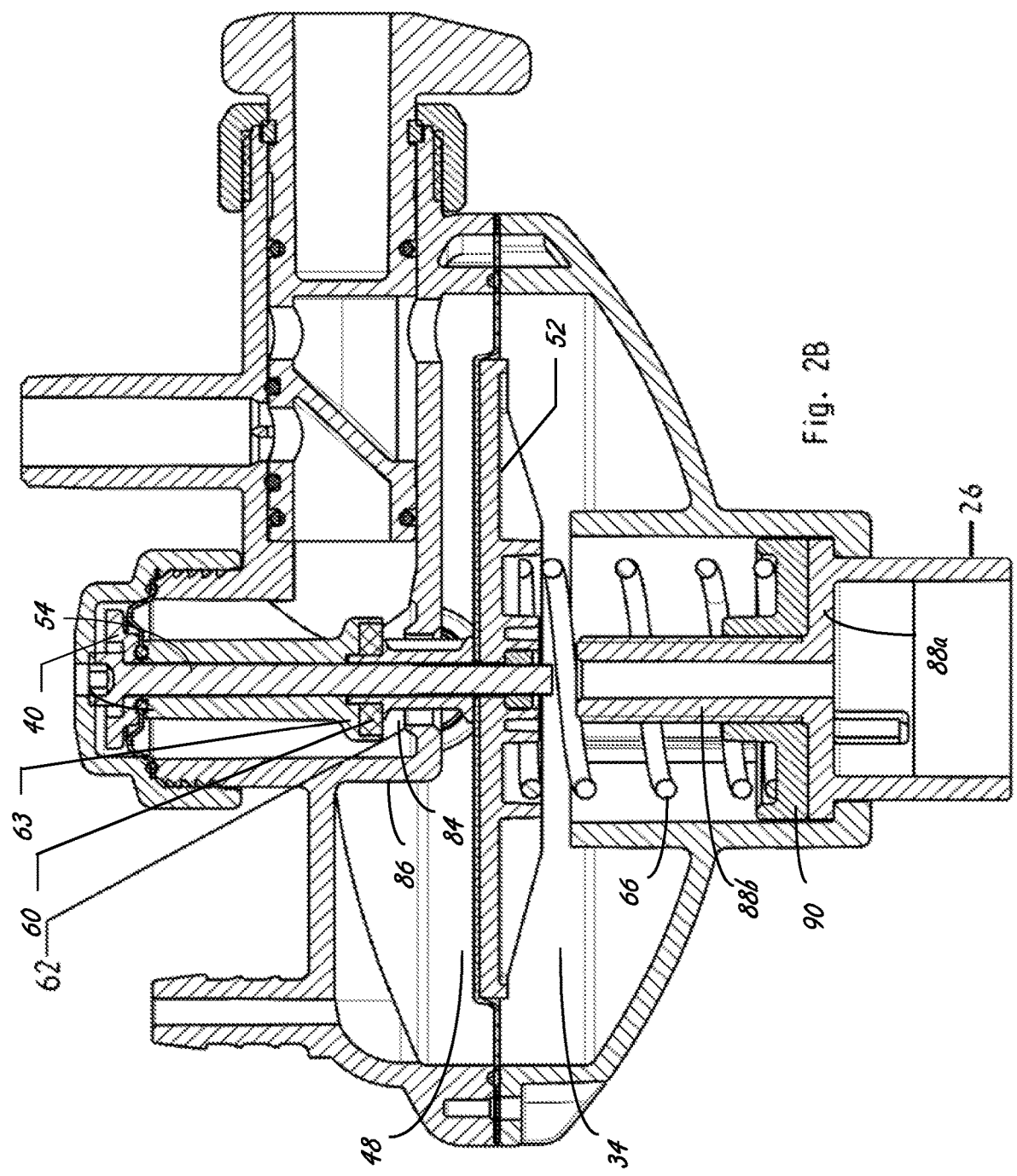

POULTRY DRINKER SYSTEM

CROSS-REFERENCE TO RELATED PATENT APPLICATIONS

This application is a Continuation in Part of U.S. patent application Ser. No. 13/558,632, filed Jul. 26, 2012, which is a national stage application of International PCT Application No. PCT/IB2011/051177 entitled "Poultry Drinker System", which claims priority to United Kingdom Patent Application No. GB 1001294.6, entitled "Poultry Drinker System", filed on 27 Jan. 2010.

BACKGROUND OF THE INVENTION

Drinker systems for supplying drinking water or the like to poultry typically include several drinker lines, each line having a plurality of water dispensers (e.g. nozzles, nipples or the like). Relatively high pressure water from a common water source is delivered to one or more regulators that provide water to the drinker line at a low/reduced pressure.

It is believed that the drinker systems disclosed in U.S. Pat. Nos. 5,967,167 and 6,253,708 well describe the present state of the art.

On the one hand, it is advantageous to keep human interference to a minimum—i.e. provide for as much automatic control of the drinking process as possible to reduce labor and avoid disturbing the flock; while on the other hand, it is advantageous to avoid the use of electrical wires and such due to the corrosive atmosphere in poultry houses; as well as to avoid complicated systems which tend to be expensive.

It is also important to be able to change (control) the water pressure to the poultry in order to encourage proper consumption, especially in the case of growing chicks whose water requirements rapidly increase as they grow. In simpler system, changing the water pressure typically requires adjustment to each drinker line, i.e. each pressure regulator and/or pressure reduction device associated with each drinker line. Further, it is desirable to design for purging (flushing) of the drinker lines to flush residual material and the like from the lines, however, without undo complication to the system to avoid expensive design.

SUMMARY OF THE INVENTION

The following embodiments and aspects thereof are described and illustrated in conjunction with systems, tools and methods which are meant to be exemplary and illustrative, not limiting in scope.

There is provided, in accordance with an embodiment, a drinker system, comprising: a central pressure regulator configured to receive a fluid from an external source and regulate the pressure of the fluid to a regulated input pressure; a plurality of drinker lines, each having a plurality of drinker nozzles; and a plurality of pressure reduction valves each in fluid connection with the central pressure regulator and one of the plurality of drinker lines, wherein each pressure reduction valve comprises: a high pressure zone configured to receive the fluid from the central regulator at the regulated input pressure, and a low pressure zone configured to receive the fluid from the high pressure zone, reduce the regulated input pressure to a low output pressure, and provide the fluid to the plurality of drinker nozzles of the one of the drinker lines at the low output pressure, wherein the low output pressure is maintained at a constant proportion to the regulated input pressure, a moveable integral piece comprising a small area diaphragm rigidly connected to a large area diaphragm, wherein the small area diaphragm is disposed in the high pressure zone and the large area diaphragm is disposed in the low pressure zone, wherein the constant proportion between the low output pressure and the regulated input pressure corresponds to the ratio between the effective surface area of the small area diaphragm and the effective surface area of the large area diaphragm.

In some embodiments, the motion of the moveable integral piece controls a flow passage from the high pressure zone to the low pressure zone, wherein the small area diaphragm is configured to transfer a net high pressure zone force on the moveable integral piece that expands the flow passage, wherein the net high pressure zone force corresponds to the regulated input pressure exerted on the effective surface area of the small area diaphragm, and wherein the large area diaphragm is configured to transfer a low pressure zone force on the moveable integral piece that constricts the flow passage and counterbalances the net high pressure zone force, thereby maintaining the flow passage at a fixed size and maintaining the constant proportion, and wherein the low pressure zone force corresponds to the low output pressure exerted on the effective surface area of the large area diaphragm.

In some embodiments, the effective surface area of the small area diaphragm comprises a difference between the actual surface area of the small area diaphragm and the actual surface area of a regulating valve disposed at the flow passage in the high pressure zone.

In some embodiments, the small area diaphragm is made of a substantially stiff material that is configured to substantially transfer the net high pressure zone force to the moveable integral piece while enabling the motion of the moveable integral piece and sealing the high pressure zone.

In some embodiments, the small area diaphragm has a maximum compression set of approximately 25% over 22 hours, at 70° C.

In some embodiments, the constant proportion ranges between 1:40 and 1:60.

In some embodiments, the large area diaphragm comprises a flexible periphery configured to enable the motion of the moveable integral piece and seal the low pressure zone.

In some embodiments, each pressure reduction valve further comprises a stiff support plate supporting a substantial portion of the large area diaphragm and configured to substantially transfer the low pressure zone force to the moveable integral piece, wherein the stiff support plate does not support the flexible periphery.

In some embodiments, the system further comprises a calibrating mechanism configured to add a differential force to the net high pressure zone force such that the low output pressure is uniform for all of the drinker lines, wherein the differential force compensates for a variation in any of the small and large area diaphragms.

In some embodiments, the calibrating mechanism comprises a calibrating spring configured to exert the differential force, and an adjusting knob, wherein an adjustment of the adjusting knob adjusts a compression and a decompression of the calibrating spring, thereby adjusting the differential force.

There is provided, in accordance with an embodiment, a method for reducing fluid pressure for a drinker system, comprising: a) receiving a fluid from an external source; b) regulating the pressure of the fluid to a regulated input pressure; c) receiving the fluid at each one of a plurality of pressure reduction valves; at each pressure reduction valve: d) receiving the fluid, from the central regulator at the regulated input pressure, at a high pressure zone; e) receiving the fluid from the high pressure zone at a low pressure zone; f) reducing, in the low pressure zone, the regulated input pressure to a low output pressure; g) maintaining the low output pressure at a constant proportion to the regulated input pressure via a moveable integral piece comprising a small area diaphragm rigidly connected to a large area diaphragm, wherein the small area diaphragm is disposed in the high pressure zone and the large area diaphragm is disposed in the low pressure zone, wherein the constant proportion between the low output pressure and the regulated input pressure corresponds to the ratio between the effective surface area of the small area diaphragm and the effective surface area of the large area diaphragm; and h) providing the fluid to a plurality of drinker nozzles of one of a plurality of drinker lines at the maintained low output pressure.

In some embodiments, maintaining comprises: i) transferring a net high pressure zone force onto the moveable integral piece via the small area diaphragm, wherein the net high pressure zone force corresponds to the regulated input pressure exerted on the effective surface area of the small area diaphragm, wherein the motion of the moveable integral piece controls a flow passage from the high pressure zone to the low pressure zone, wherein the net high pressure zone force expands the flow passage, and j) transferring a low pressure zone force onto the moveable integral piece via the large area diaphragm, wherein the low pressure zone force corresponds to the low output pressure exerted on the effective surface area of the large area diaphragm, wherein the low pressure zone force constricts the flow passage and counterbalances the net high pressure zone force, thereby maintaining the flow passage at a fixed size.

In some embodiments, the effective surface area of the small area diaphragm comprises a difference between the actual surface area of the small area diaphragm and the actual surface area of a regulating valve disposed at the flow passage in the high pressure zone.

In some embodiments, the method further comprises substantially transferring the net high pressure zone force to the moveable integral piece via the small area diaphragm, wherein the small area diaphragm is made of a substantially stiff material configured to enable the motion of the moveable integral piece while sealing the high pressure zone.

In some embodiments, the method further comprises substantially transferring the low pressure zone force to the moveable integral piece via a stiff support plate supporting a substantial portion of the large area diaphragm, wherein the large area diaphragm comprises a flexible periphery that is not supported by the stiff support plate, wherein the flexible periphery is configured to enable the motion of the moveable integral piece while sealing the low pressure zone.

In some embodiments, the method further comprises calibrating the plurality of pressure reduction valves by: prior to performing steps a) to h), releasing a calibration spring of each of the pressure reduction valves, performing steps a) to h), determining the maximum low output pressure for all the pressure reduction valves, and adjusting the calibration spring to add a differential force to any pressure reduction valve having a low output pressure that is less than the maximum low output pressure, until the low output pressure is uniform for all of the pressure reduction valves, wherein the differential force compensates for a variation in any of the small and large area diaphragms.

In some embodiments, adjusting the calibration spring comprises adjusting a calibrating screw via a calibration knob.

In addition to the exemplary aspects and embodiments described above, further aspects and embodiments will become apparent by reference to the figures and by study of the following detailed description.

BRIEF DESCRIPTION OF THE DRAWINGS

The invention may be understood upon reading of the following detailed description of non-limiting exemplary embodiments thereof, with reference to the following drawings, in which:

FIGS. 2A-2C are sectional views of a proportional pressure regulating/reduction valve device particularly adapted for use in the present drinker system, the device in: (a) the closed (no flow), non-flushing state; (b) the normal flow, non-flushing state; and (c) in the flushing state, respectively;

The following detailed description of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF EMBODIMENTS OF THE INVENTION

Figure 1:
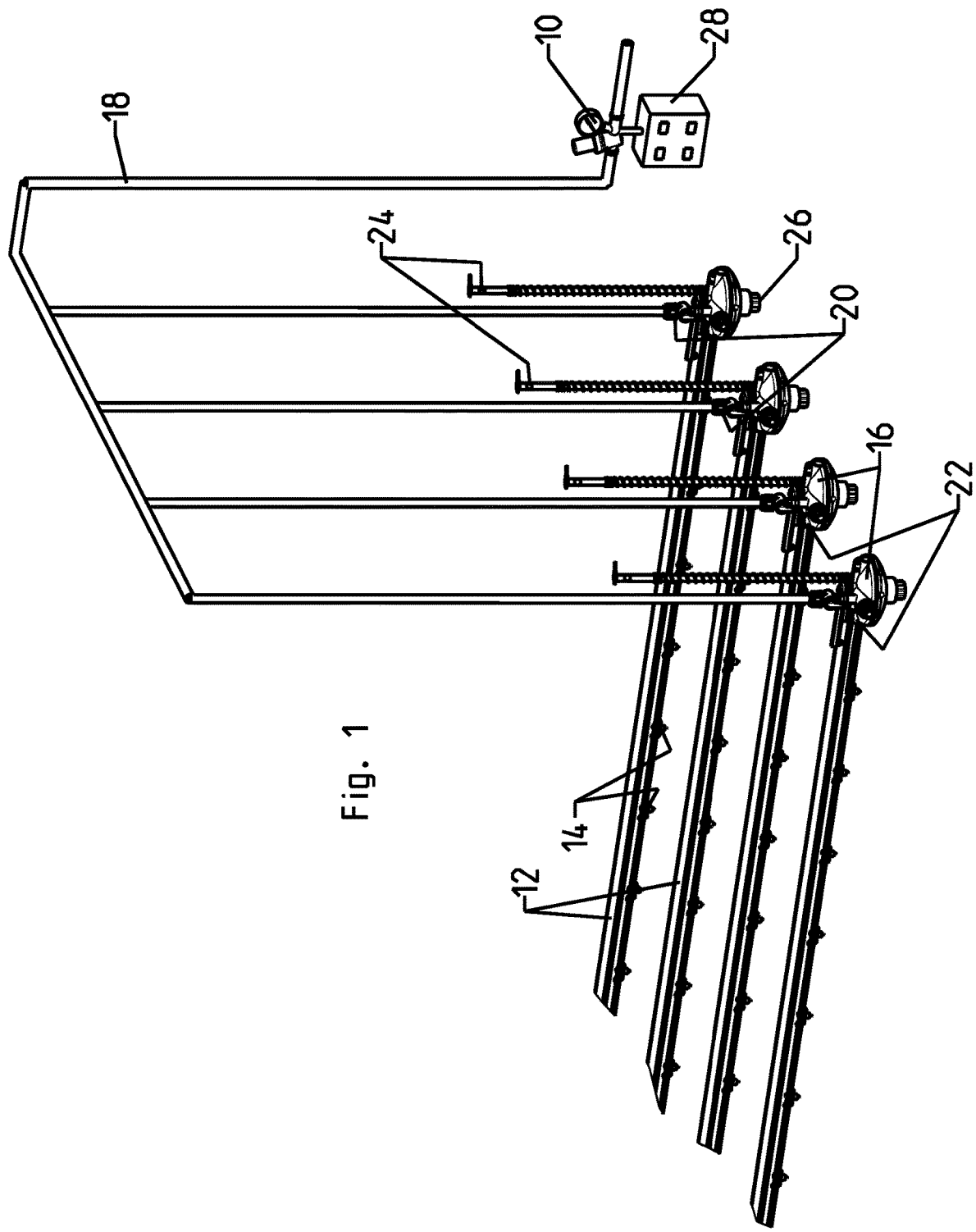
FIG. 1 is a perspective view of an embodiment of a poultry drinker system of the present invention.

FIG. 1 shows a drinker system in accordance with embodiments of the invention for receiving water or other liquid from a relatively high pressure liquid/water source (not shown), for example at mains pressure, while providing the liquid at a relatively low pressure, to animals, such as poultry. The drinker system includes a central pressure regulator 10 for providing a first pressure reduction to the water from the water source; a plurality of drinker lines 12, each line having a plurality of drinker nozzles 14; and a plurality of pressure reduction valve devices 16, one such device associated with each drinker line, for providing the liquid at a relatively low pressure to the at least one drinker line.

Water flowing from central pressure regulator 10 to pressure reduction devices 16 is typically run through piping 18 preferably having a height well above the floor of the watering area in which the poultry are situated and even more so above the height of humans, for example, about 2.5 m in order to prevent the piping from disturbing the poultry and for ease of human movement in the poultry house if required. As a result, the minimum pressure at which water arrives to the pressure reduction devices 16 is equal to the head of the water or about 250 cm water column. Piping 18 leads to inlets 20 of the pressure reduction devices 16; and drinker lines 12 are fed by outlets 22 of the pressure reduction devices.

Also notable in FIG. 1 is a drinker line pressure indicator, for example, a transparent site glass or site tube 24 associated with each pressure reduction device 16 for measuring and displaying the outlet pressure, i.e. water pressure delivered to each drinker line 12; and a pressure zeroing knob 26 for initial calibration (setting/zeroing) of the pressure reduction devices' outlet pressure. In some embodiments, the system further includes an electronic pressure controller 28 for automatic adjustment of the central pressure regulator 10.

In practice, high pressure water arriving from the high pressure water source is regulated via central pressure regulator 10 to a relatively intermediate pressure, typically in the range of 0.25-3.0 bar. The water is distributed via piping 18 to each of the plurality of pressure reduction valve devices 16 where the water pressure is reduced again, in a manner proportional to the pressure set by central pressure regulator 10 (as will be explained in more detail below). The pressure of the water delivered to the drinker lines 12 (i.e. to the poultry) can therefore be controlled by controlling central pressure regulator 10. This is significant as it is important to maintain proper pressure, which changes as the poultry grows and due to other conditions, in order to positively affect the health and growth of the poultry, especially rapidly growing chicks, for example.

Figure 2A:
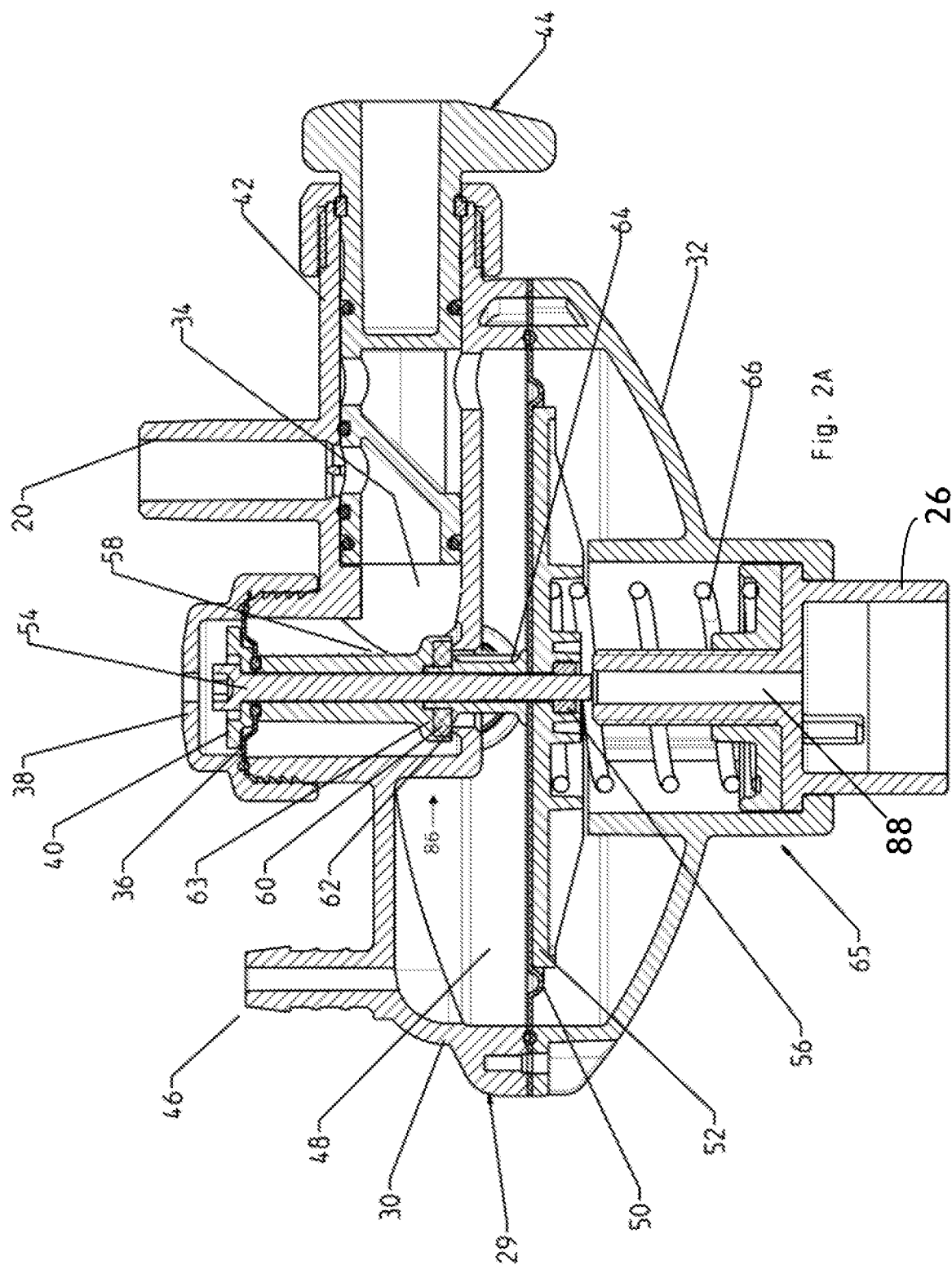
Figure 2C:
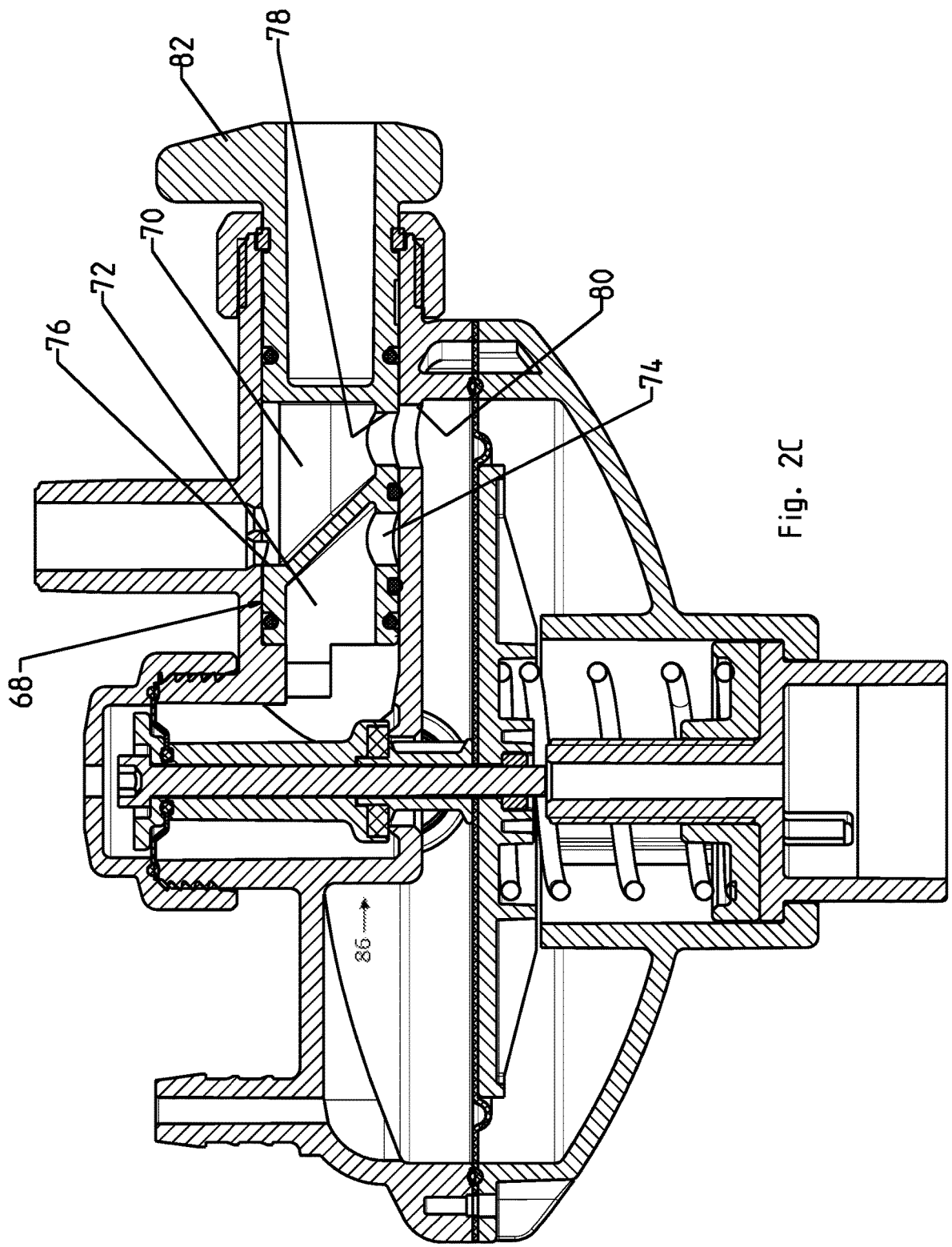

In FIGS. 2A-2C there is shown an embodiment of the pressure reduction devices 16 by way of sectional views thereof in various states of operation. The devices 16 include a housing 29 with an upper housing portion 30 and a lower housing portion 32, the upper housing portion defining a first relatively high pressure zone 34 (at a pressure regulated by central pressure regulator 10) which during drinking (normal flow) receives water via inlet 20. In high pressure zone 34 is a relatively small area diaphragm 36 fixed at its periphery between a cap 38 and upper housing portion 30 and supported by a relatively small area support plate 40. Upper housing portion 30 also defines a tubular by-pass or flushing valve receiving portion 42 for receiving an integrated internal by-pass or flushing valve 44 of the valve device 16.

Upper housing portion 30 also includes a pressure measurement connection or nipple 46 to which site tube 24 is connected. The site tube 24 communicates with a relatively low pressure zone 48 of the proportional pressure reducing valve device 16. Low pressure zone 48 is generally defined by upper housing portion 30 and a relatively large area diaphragm 50, which is supported by a relatively large area support plate 52. Small diaphragm 36 is operably connected to large diaphragm 50 via a rigid connector, for example bolt 54 and nut 56. Surrounding bolt 54 in high pressure zone 34 is a first rigid sleeve 58.

The ratio of the areas of the diaphragms 36 and 50 provide for a pressure reduction valve device outlet pressure that is proportional to the valve device's inlet pressure, i.e. the pressure set by the regulator 10. A typically pressure ratio is about 40:1. Thus, for example, controlling the central pressure regulator 10 in a range of 0.25-3.0 bar results in a drinker line pressure about 0.0065-0.075 bar (6.5-75.0 cm water column).

A first end of sleeve 58 interfaces with diaphragm 36 and a valve seal 60 is disposed within a second end of the sleeve. The valve seal 60 interfaces with a valve seat 62 when the valve device 16 is in the closed (no flow) state (FIG. 2A). The valve seal 60 and valve seat 62 form a regulating valve 63 of the pressure reduction valve device 16. A second rigid sleeve 64 surrounds the bolt 54 in low pressure zone 48.

Housed in lower housing portion 32 is a calibration mechanism 65 having a calibration or zeroing spring 66, which is adjustable by the pressure zeroing knob 26 and a calibrating screw mechanism 88, comprising a screw post 88b coupled with a threaded nut 90. The calibration mechanism 65 is used to affect/adjust the initial outlet pressure of the valve devices, which is sometimes not completely consistent from device to device due to minor tolerances in the components thereof.

Calibrating spring 66 is configured to exert a differential force to compensate for these inconsistencies. Adjusting knob 26 adjusts calibrating screw mechanism 88 which adjusts the compression and decompression of calibrating spring 66, thereby adjusting this differential force, and which will be described in greater detail below. Typically, a one-time setting/calibration ("zeroing") is all that is required to coordinate the outlet pressure of the plurality of valve devices 16, which is verifiable by the site tubes 24.

FIG. 2A shows the pressure reduction valve device 16 in a closed (non-flow) state, which occurs when the pressure in the drinker line 12, or more specifically the pressure in low pressure zone 48, is not below the pressure in the high pressure zone 34 divided by the pressure reduction factor. The desired pressure of water fed to the drinker lines 12 (i.e. in the low pressure zone 48), is the pressure in the high pressure zone 34 divided by the ratio of areas of the large diaphragm 50 to the small diaphragm 36 (pressure reduction factor). Thus, the pressure pushing (down) on the large diaphragm 50, translated to its support plate 52, pulls (down) on bolt 54, to close the regulating valve 63, i.e. close seal 60 to seat 52.

FIG. 2B shows the pressure reduction valve device 16 in an open (normal-flow) state, which occurs when the pressure in the drinker line 12, or more specifically the pressure in low pressure zone 48, is below the pressure in the high pressure zone 34 divided by the pressure reduction factor, which occurs when the drinker nozzles 14 (not shown) are opened, such as when the chicks are drinking. Thus, the relatively high pressure in the high pressure zone 34 pushes (up) on its support plate 40, moving (raising) bolt 54, to open the regulating valve 63, i.e. open seal 60 from seat 52.

FIG. 2C shows the pressure reduction valve device 16 in a bypass (flushing/purging) state, which shall be described in conjunction with a description of details of integrated internal by-pass or flushing valve 44. Flushing valve 44 has an extension 68 extending into flushing valve receiving portion 42 and with a by-pass channel 70 and a normal flow channel 72, at the distal end thereof. Normal flow channel 72 has a channel inlet 74 which is aligned with valve device inlet 20 when the by-pass valve 44 of the valve device 16 is in the non-flushing state (FIGS. 2A and 2B); and not aligned with the valve device inlet 20 when in the flushing state (FIG. 2C). By-pass channel 70 has an opening 76 which is aligned with valve device inlet 20 when the by-pass valve 44 of the valve device 16 is in the flushing state (FIG. 2C); and not aligned with the valve device inlet 20 when in the non-flushing state (FIGS. 2A and 2B). By-pass channel 70 further has an outlet 78 which is aligned with a flushing aperture 80 of the upper housing portion 30 when in the flushing state (FIG. 2C).

In one exemplary alternative embodiment (not shown), the by-pass valve 44 is designed to be insertable and partially withdrawn (for example having an inward/outward screwing mechanism) in order to align apertures or channels with the valve device's inlet 20 to vary flow between a flushing and non-flushing state, mutatis mutandis.

By-pass valve has a manual operation knob 82 for convenient actuation of the flushing state, however, in some embodiments (not shown), the valve device 16 includes an automatic flush-activation mechanism, for example, including a small motor for rotating the by-pass valve 44 between the flushing and non-flushing states (or other such mechanisms, for example wherein the by-pass valve is moved inward and outward to provide flow passage switching between a flushing and non-flushing mode). Another example of an automatic flushing mechanism (by-pass mechanism) is an electrically operated valve (not shown) having an inlet connected externally at or near inlet 20 and having an outlet connected to the flushing valve receiving portion 42 wherein the receiving portion 42 is hydraulically separated (e.g. by an internal wall) from the inlet 20 so as to deliver the flushing liquid directly to flushing aperture 80 of the upper housing portion 30.

Thus, there is provided a cost effective and uncomplicated drinker system and pressure reduction valve device therefor. The pressure in the drinker lines 12 is conveniently controllable by controlling the pressure at the central pressure regulator 10.

Further, the drinker lines 12 and the low pressure zone 48 of the pressure reduction valve device 16 are conveniently flushable without need for expensive or complicated auxiliary systems. While the by-pass mechanism described in embodiments of the present drinker system and valve device therefor, does not rinse the high pressure zone 34, this is typically not a practical concern.

A more detailed description of the internal mechanism of pressure reduction valves 16 with respect to FIGS. 1, 2A-2C, and 3 is now disclosed. The terms 'up' and 'down', 'upper', and 'lower' relate to the orientation of device 16 as shown in the drawings for illustrative purposes only, and are not meant to be limiting in an absolute sense. The drinker system includes central pressure regulator 10 that receives a fluid from an external source, such as a main water supply, and regulates the pressure of the fluid from the pressure supplied by the external source to a regulated input pressure $P_{IN}$. For example, the pressure provided by the main supply may be substantially high and may fluctuate, and the regulator 10 may regulate the varying pressure to a relatively high, and steady input pressure, in accordance with a setting controlled by a user.

Multiple pressure reduction valves 16 are provided, each in fluid connection with regulator 10 and one of the plurality of drinker lines 12, each line 12 having a plurality of drinker nozzles 14.

Each pressure reduction valve 16 includes high pressure zone 34 insulated from a low pressure zone 48 by an inner wall 86. Fluid flowing from central regulator 10 at the regulated input pressure is received by valve 16 at high pressure zone 34. The fluid flows from high pressure zone 34 via a flow passage 84 penetrating inner wall 86, shown in FIG. 2B, to low pressure zone 48, where the regulated input pressure is reduced to a low output pressure $P_{OUT}$. Flow passage 84 may be controlled by regulating valve 63. The fluid flows out of valve 16 from low pressure zone 48 to each of the drinker lines 12, where it is provided to each of drinker nozzles 14 at the low output pressure $P_{OUT}$. Valves 16 operate to maintain the low output pressure at a constant proportion to the regulated input pressure, where the constant proportion corresponds to the ratio between the effective, or 'net' surface area of small area diaphragm 36 and the effective surface area of the large area diaphragm 50, or:

$$P_{IN}/P_{OUT} = AREA_{LARGE\ DIPHRAGM}/AREA_{SMALL\ DIAPHRAGM}$$

This ratio is maintained as follows:

Each pressure reduction valve 16 has a small area diaphragm 36 disposed at the top of high pressure zone 34 and rigidly connected via bolt 54 to large area diaphragm 50 disposed at the bottom of low pressure zone 48. Small area diaphragm 36 connected to large area diaphragm 50 form an integral piece that is moveable with respect to housing 29. The motion of the integral piece controls regulating valve 63, which controls the size of flow passage 84. Thus, controlling the motion of the integral piece allows controlling the fluid flow from high pressure zone 34 to low pressure zone 48.

On receiving the fluid at the regulated input pressure $P_{IN}$ in high pressure zone 34, the net high pressure zone force, corresponding to the regulated input pressure exerted on the effective surface area of small area diaphragm 36, is transferred by small area diaphragm 36 onto the integral piece. Optionally, small area diaphragm 36 is made of a sufficiently stiff material that substantially transfers the net high pressure zone force to the moveable integral piece while still enabling the motion of the moveable integral piece within housing 29 and sealing high pressure zone 34. This net high pressure zone force pushes the integral piece upwards with respect to housing 29, opening valve 63 and expanding flow passage 84.

Optionally, the effective surface area of small area diaphragm 36 is the difference between the actual surface area of the small area diaphragm and the actual surface area of regulating valve 63 disposed at flow passage 84 in high pressure zone 34, and thus represents the net surface area of small area diaphragm 36 that is affected by the fluid pressure. Optionally, the effective surface area of small area diaphragm 36 accounts for any distortion and/or absorption of fluid pressure due to any non-rigidity of small area diaphragm 36. For example, the size of small area diaphragm 36 may account for any expected loss of force created by fluid pressure due to absorption and/or distortion of small area diaphragm 36, such as if small area diaphragm 36 is made of a material that has an amount of flexibility.

Thus, the net high pressure zone force, $F_{HIGH}$, is the difference between the upwards force resulting from the input pressure exerted on small diaphragm 36 less the downwards force resulting from the input pressure exerted on valve 63:

$$F_{HIGH} = F_{SMALL\ DIAPHRAGM} - F_{VALVE}$$
$$= P_{IN}(AREA_{SMALL\ DIAPHRAGM} - AREA_{VALVE})$$

On receiving the fluid from high pressure zone 34 at low pressure zone 48, a low pressure zone force, $F_{LOW}$ is transferred by diaphragm 50 onto the moveable integral piece. $F_{LOW}$ corresponds to the low output pressure $P_{OUT}$ exerted on the effective surface area of large area diaphragm 50, $AREA_{LARGE\ DIAPHRAGM}$:

$$F_{LOW} = P_{OUT} \times AREA_{LARGE\ DIAPHRAGM}$$

This low pressure zone force constricts flow passage 84 in a manner that counterbalances the net high pressure zone force, i.e. $F_{HIGH}=F_{LOW}$, to maintain flow passage 84 at a fixed size, acting as a pressure resistance to create a pressure drop from the high pressure $P_{IN}$ to the low pressure $P_{OUT}$, and thereby maintains the constant proportion between the low output pressure $P_{OUT}$ and the regulated input pressure $P_{IN}$.

Optionally, a sufficient portion of diaphragm 50 is supported by a stiff support plate 52 that allows the substantial transfer of the low pressure zone force onto the moveable integral piece.

Optionally, support plate 52 has a smaller surface area than diaphragm 50, such that diaphragm 50 has a flexible peripheral region that is not supported by support plate 52. The flexible periphery may enable the motion of the moveable integral piece with respect to housing 29 while sealing the low pressure zone. The flexible periphery may be sufficiently small with respect to the surface area of diaphragm 50 such that any low pressure zone force absorbed by a distortion of the peripheral region is negligible. The width of the flexible periphery may range from 5 mm to 35 mm, and may be approximately 25 mm±10%.

Calibrating mechanism 65 may be provided with each valve 16 to add a differential force to the net high pressure force $F_{HIGH}$ This differential force may slightly adjust the size of passageway 84, and thereby calibrate valves 16 of the drinker system, such that the low output pressure, $P_{OUT}$, is substantially uniform for all the drinker lines 12.

To achieve this effect, spring 66 may be supported by nut 90, the height of which is adjustable by rotating screw post 88b within threaded nut 90, as shown in FIG. 2B. The height of nut 90, and thus the compression of spring 66, may be adjustable, either manually or electro-mechanically, via adjusting knob 26 mechanically connected to screw post 88b. Screw post 88b may be axially fixed relative to lower housing portion 32. Nut 90 may be rotationally fixed to lower housing portion 32 but free to move axially (up and down). Turning knob 26 rotates screw post 88b within the threads of nut 90, either clockwise or counter-clockwise depending on the direction that knob 26 is turned. Since the position of screw post 88b is axially fixed relative to lower housing portion 32, rotating screw post 88b within the threads of nut 90 pushes nut 90 upwards or downwards, causing spring 66, which rests on nut 90, to compress or decompress accordingly. Thus the compression of spring 66 may be controlled in advance, via the calibrating mechanism, to exert the differential upward force on regulating valve 63 required to slightly widen the gap of the passageway 84, such that all the devices 16 output substantially the same output pressure $P_{OUT}$ to the drinker lines 12. This customized differential force may compensate for any individual variations in any of small and large area diaphragms 36 and 50 across each of valves 16 such as variations in surface area, thickness, flexibility, to name a few, such that each of valve's 16 output pressure is substantially the same.

Figure 4:
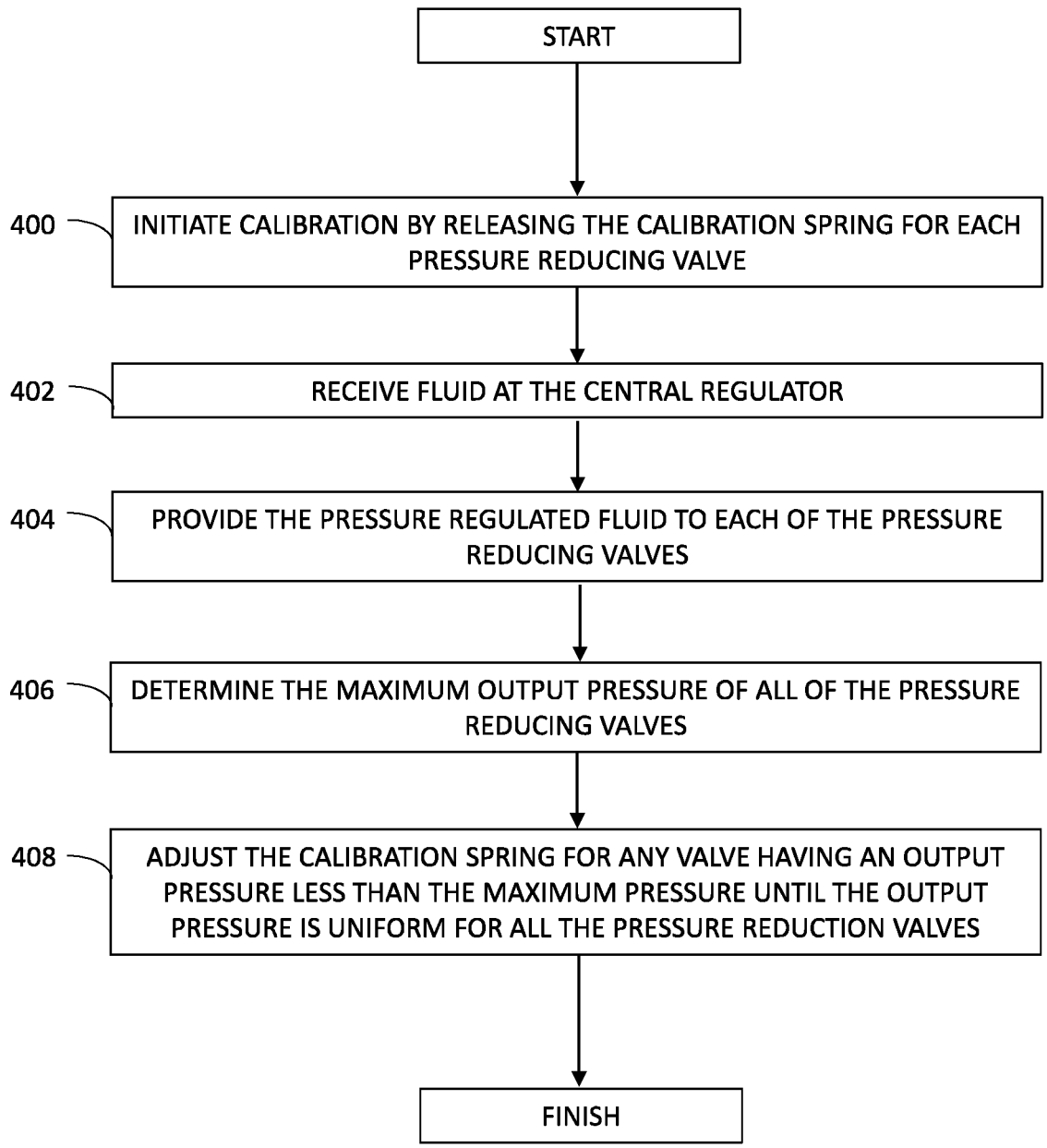
FIG. 4 is a flowchart of a method for calibrating the system of FIG. 1.

Reference is now made to FIG. 4 which illustrates a flowchart of a method for calibrating the drinker system of FIG. 1, in accordance with an embodiment. Prior to introducing fluid to the system, the calibrating springs 66 of each pressure reduction valve 16 may be fully released, such as by adjusting pressure zeroing knob 26, resulting in a minimal height for diaphragm 50 and a minimal sized flow passage 84 (Step 400). Fluid may be received at central regulator at a high and/or varying pressure, such as from a main water source as described above (Step 402). The pressure may be regulated by regulator 10, and the pressure regulated fluid may be provided to the multiple pressure reduction valves 16 (Step 404). Each valve may reduce the pressure at a constant proportion corresponding to the ratio between the surface areas of the large area diaphragm 50 and small diaphragm 36 disposed with each valve 16. Due to slight variations in the diaphragms of each valve 16, such as variations in size, thickness, stiffness, or other property, the low output pressure $P_{OUT}$ of each valve 16 may vary accordingly. Since spring 66 may increase the output pressure of any of valves 16 by raising the integral piece with respect to house 29, opening valve 63 and expanding flow passage 84, spring 66 may be used to correct and/or compensate for these variations and provide a uniform fluid pressure for all of the drinker lines 12. Another way to evaluate the contribution of spring 66 in adjusting the output pressure $P_{OUT}$ is to consider the differential force $F_{SPRING}$ added by spring in the direction of the high pressure zone force $F_{HIGH}$ and which is counterbalanced by $F_{LOW}$ as follows:

$$F_{HIGH} = F_{SMALL\ DIAPHRAGM} - F_{VALVE} + F_{SPRING} = F_{LOW}$$

The maximum low output pressure, $MAX(P_{OUT})$ provided by any of valves 16 may be determined (Step 406). For example, the output pressure of each of valves 16 may be read from site tube 24. Calibration spring 66 may be adjusted to add a differential force $F_{SPRING}$ to any of pressure reduction valves 16 having a low output pressure $P_{OUT}$ that is less than the maximum low output pressure, $MAX(P_{OUT})$, until the low output pressure is uniform for all of the pressure reduction valves. Thus, $F_{SPRING}$ increases the output pressure at each valve 16 until the output pressure for all the valves 16 is uniform. For example, after calibrating, all the valves 16 may deliver fluid to drinker lines 12 at $MAX(P_{OUT})$. The central pressure regulator 10 may then be adjusted to fine tune the output pressure to a desired level.

For example, when valve 16 is configured to reduce pressure at a ratio of 50:1, fluid exiting regulating valve 10 and entering high pressure zone 34 of valve 16 at a regulated pressure of 2.0 bar is reduced to approximately 0.0.04 bar (40 milibar) in low pressure zone 48, and is subsequently provided to drinker lines at the low pressure of 0.0.04 bar. Regulating valve 10 may provide a relatively constant pressure, and thereby account for fluctuations in fluid pressure from the external source.

Figure 2D:
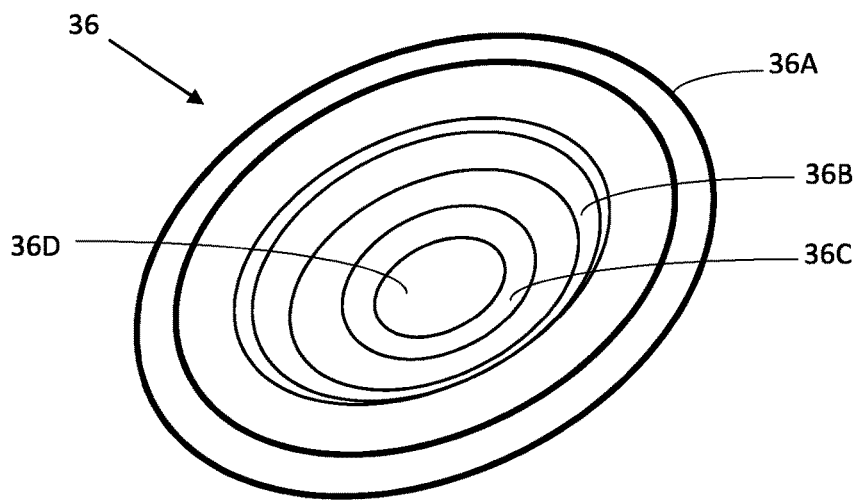
FIGS. 2D-2E illustrate a close-up perspective view and a cross-sectional view, respectively, of a small diaphragm of the pressure regulating valve of FIGS. 2A-2C, in accordance with an embodiment.
Figure 2E:
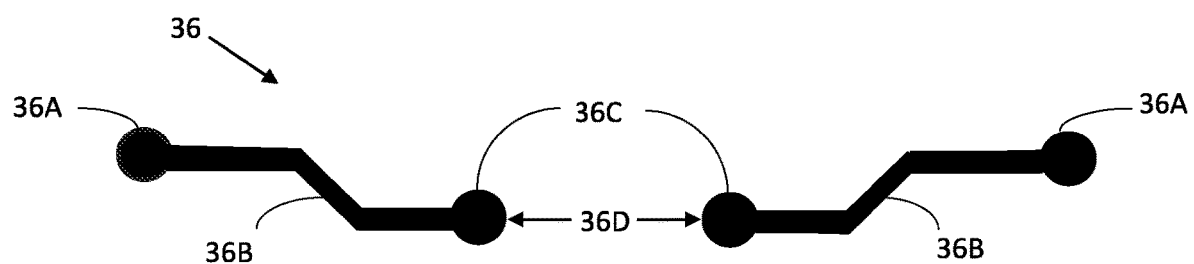

Reference is now made to FIGS. 2D-2E which illustrate a close-up perspective view and a cross-sectional view, respectively, of small diaphragm 36, in accordance with an embodiment. Diaphragm 36 may be made of any suitably flexible sealing material, such as natural rubber, butyl rubber, ethylene propylene (EPDM), polystyrene. Diaphragm 36 may have a maximum compression set ranging from 20%-30% over a time span ranging from 20-25 hours at a temperature ranging from 65° C.-75° C. Optionally, diaphragm 36 has a maximum compression set of approximately 25% over 22 hours, at 70° C. Diaphragm 36 may have an outer sealing rim 36A configured to seal high pressure zone 34 at the top portion of housing 30, a beveled edge 36B, an inner sealing rim 36C that is configured to sealingly enclose bolt 54 positioned within an opening 36D. The elasticity of diaphragm 36 may allow the integral piece to move relative to housing 30 while maintain an intact seal between high pressure zone 34 and the outside atmosphere. The size of opening 36D may be approximately 10 millimeters (mm)±10%. The height of diaphragm 36 in its normal, uncompressed or stretched state is approximately 4.8 mm±10%. The total diameter of diaphragm 36 may be approximately 33.75 mm±0.3 mm.

The exposed surface of valve 63 may be ring-shaped, corresponding to a disk-shape less the surface area of bolt 54 encased by rigid sleeve 58. The thickness of the ring may range from 2 to 10 mm, and may be approximately 5 mm±10%. The radius from the original of the ring until the outer edge may range from 5 mm to 20 mm and may be approximately 12 mm±10%.

The ratio between large diaphragm 50 and small diaphragm 36 and, and thus the ratio between $P_{OUT}$ and $P_{IN}$ may range between 1:40 and 1:60, or optionally between 1:49 and 1:51. Optionally, the sizes of small diaphragm 36 and large diaphragm 50 may be designed to provide a ratio slightly higher than the desired constant proportional reduction in fluid pressure, to allow adjusting to the desired ratio by adding the differential force as described above. For example, if the desired constant proportion is 1:50, allowing an input fluid pressure of 2 bar to be provided to nozzles 14 at an output pressure of 0.0.04 bar, the diaphragms may be manufactured to have an actual ratio of 1:49. If the actual ratios of the valves vary within an acceptable tolerance such that one of the valves approaches the desired constant proportion of 1:50, the remaining valves may be adjusted via spring 66 to achieve this constant proportion, such that all the valves reduce the pressure at the desired constant proportion of 1:50.

Figure 3:
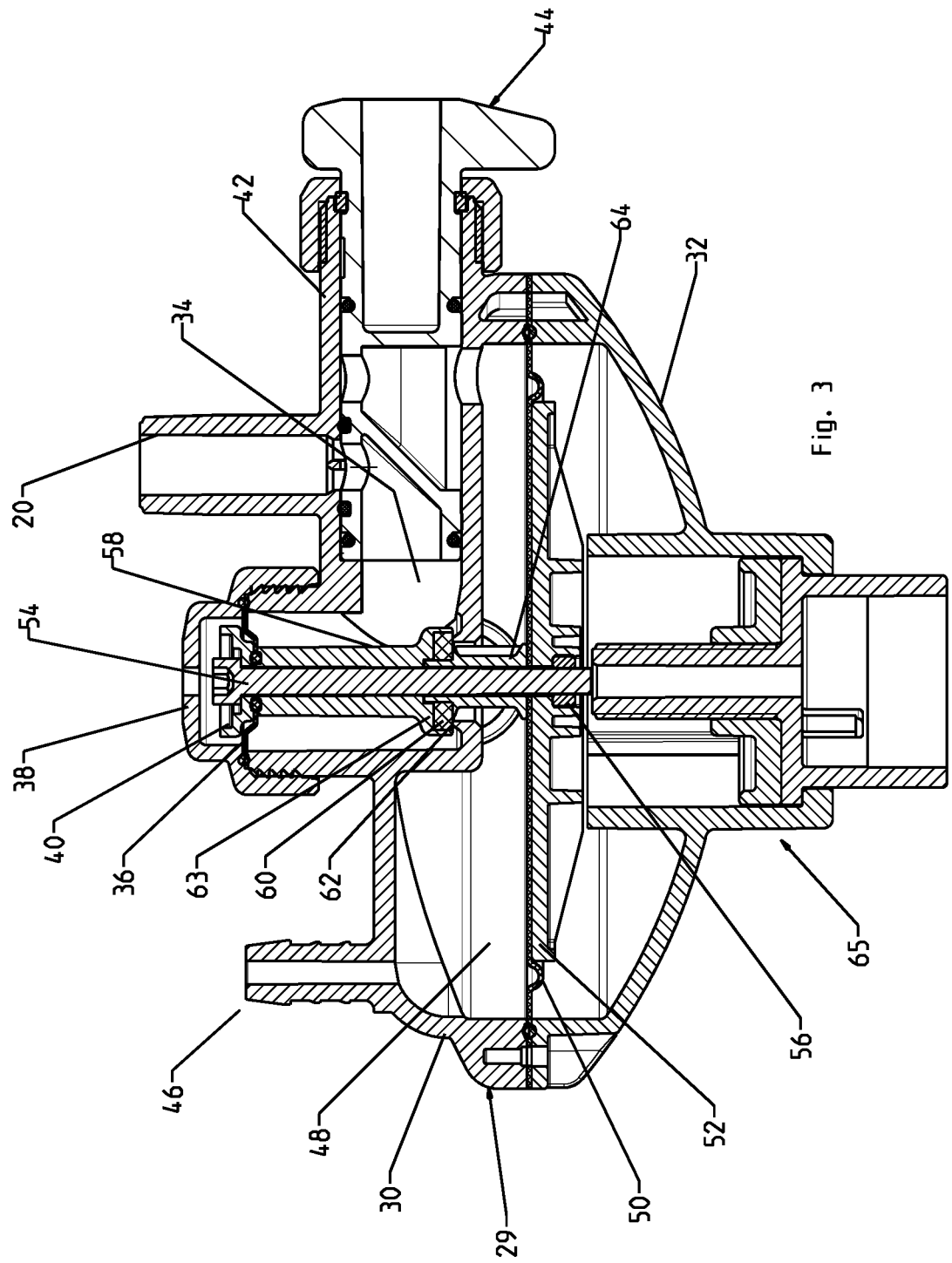
FIG. 3 is a sectional view of a proportional pressure regulating/reduction valve device in accordance with a relatively simplified embodiment of the present invention.

FIG. 3 depicts an embodiment of the present invention wherein there is no zeroing mechanism and thus no zeroing spring 66 or zeroing knob 26.

Operation: the poultry drinker system is operated by adjusting a central pressure regulator, such as regulator 10, to control the pressure in the drinker lines 12, which can include periodically operating an integrated flushing/by-pass mechanism, for example, constituted by integrated internal by-pass or flushing valve 44 integrated into each of the plurality of pressure reduction valve devices 16, in order to flush the drinker lines.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

What is claimed is:

1. A method for reducing fluid pressure for a drinker system, comprising:
   a) receiving a fluid from an external source;
   b) at a central regulator, regulating the pressure of the fluid to a regulated input pressure;
   c) receiving the fluid at a plurality of pressure reduction valves each configured to reduce the regulated input pressure at a single ratio selected from the range of 40:1 to 60:1, and each comprising:
      a high pressure zone,
      a low pressure zone, and
      a moveable integral piece comprising:
         a small area diaphragm disposed in the high pressure zone and being rigidly connected to a large area diaphragm that is disposed in the low pressure zone, and
         a regulating valve disposed in the high pressure zone and comprising: an exposed, ring-shaped surface area that faces the small area diaphragm, and an opposing seal that faces a valve seat, wherein the seal and the valve seat define a flow passage between the high pressure zone and the low pressure zone,
      wherein, to facilitate the reduction of the regulated input pressure at the single ratio, the single ratio is equal to a ratio between an effective surface area of the large area diaphragm and an effective surface area of the small area diaphragm,
      wherein the effective surface area of the small area diaphragm is a difference between an actual surface area of the small area diaphragm and the exposed, ring-shaped surface area of the regulating valve;
   d) at each of the pressure reduction valves:
      i) receiving the fluid, from the central regulator at the regulated input pressure, at a high pressure zone;
      ii) receiving the fluid from the high pressure zone at a low pressure zone;
      iii) reducing, in the low pressure zone, the regulated input pressure to a low output pressure according to the single proportion;
      iv) providing the fluid to a plurality of drinker nozzles of one of a plurality of drinker lines, at the low output pressure; and
   e) adjusting the regulated input pressure at the central pressure regulator, to adjust the low output pressure at the plurality of drinker lines.

2. The method according to claim 1, wherein the small area diaphragm is made of a substantially stiff material configured to enable the motion of the moveable integral piece while sealing the high pressure zone.

3. The method according to claim 1, wherein each of the plurality of pressure reduction valves further comprises a stiff support plate supporting a substantial portion of the large area diaphragm, wherein the large area diaphragm comprises a flexible periphery that is not supported by the stiff support plate, wherein the flexible periphery is configured to enable the motion of the moveable integral piece while sealing the low pressure zone.

4. The method according to claim 1, further comprising calibrating the plurality of pressure reduction valves to compensate for manufacturing variations in any of size, thickness, and stiffness of the large and small area diaphragms, so that the single ratios of pressure reduction by all of the pressure reduction valves are the same, by:
   prior to performing steps a) to d), releasing a calibration spring of each of the pressure reduction valves,
   performing steps a) to d),
   determining what is a maximum low output pressure across all the pressure reduction valves, and
   adjusting the calibration spring to add a differential force to any pressure reduction valve having a low output pressure that is less than the maximum low output pressure, until the low output pressure is uniform for all of the pressure reduction valves, wherein the differential force compensates for the manufacturing variations of any of the small and large area diaphragms.

5. The method according to claim 4, wherein adjusting the calibration spring comprises adjusting a calibrating screw via a calibration knob.

* * * * *